United States Patent
Price et al.

(10) Patent No.: US 8,825,082 B2
(45) Date of Patent: *Sep. 2, 2014

(54) SYSTEMS AND METHODS FOR GATHERING INFORMATION ABOUT DISCRETE WIRELESS TERMINALS

(71) Applicant: Prima Research, LLC., Denver, CO (US)

(72) Inventors: Christopher Price, Denver, CO (US); Gregory J. Beveridge, Thornton, CO (US)

(73) Assignee: Prima Research, LLC., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/084,576

(22) Filed: Nov. 19, 2013

(65) Prior Publication Data

US 2014/0080518 A1    Mar. 20, 2014

Related U.S. Application Data

(63) Continuation-in-part of application No. 13/656,450, filed on Oct. 19, 2012, now Pat. No. 8,594,703, and a continuation-in-part of application No. 12/463,138, filed on May 8, 2009, now Pat. No. 8,315,598.

(51) Int. Cl.

| | | |
|---|---|---|
| *H04W 24/00* | (2009.01) | |
| *H04W 64/00* | (2009.01) | |
| *H04W 12/08* | (2009.01) | |
| *G01S 5/14* | (2006.01) | |
| *H04W 48/04* | (2009.01) | |

(52) U.S. Cl.
CPC .............. *H04W 64/00* (2013.01); *H04W 12/08* (2013.01); *G01S 5/14* (2013.01); *H04W 48/04* (2013.01)

USPC ................. 455/456.2; 455/456.1; 455/456.3; 455/456.4; 455/456.5; 455/456.6; 455/404.2; 455/414.1; 455/414.2; 455/411

(58) Field of Classification Search
USPC .......... 455/456.1, 456.2, 456.3, 456.5, 456.6, 455/414.1, 414.2, 404.2, 411
See application file for complete search history.

(56) References Cited

U.S. PATENT DOCUMENTS

| | | |
|---|---|---|
| 4,494,119 A | 1/1985 | Wimbush |
| 8,315,598 B2 * | 11/2012 | Price ............................ 455/411 |
| 2004/0203380 A1 | 10/2004 | Hamdi |
| 2005/0192026 A1 | 9/2005 | Carlson |

(Continued)

OTHER PUBLICATIONS

Robert J. Fontana and Steven J. Gunderson, Ultra-Wideband Precision Asset Location System, Proceedings IEEE Conference on Ultra Wideband Systems and Technologies, May 2002.

*Primary Examiner* — Khalid Shaheed
(74) *Attorney, Agent, or Firm* — Great Lakes Intellectual Property, PLLC.

(57) ABSTRACT

The present invention is broadly directed to systems and methods for gathering information about wireless transceiver devices in a defined boundary region. To this end, the disclosure is more particularly directed to gathering movement information (e.g., via detection and location) about two-way end-user wireless terminals within three-dimensional boundaries of defined local space ("DLS") to allow for selective control of the terminals and other subsystems, as desired. Additionally, the data collected can be used to improve accuracy and precision regarding the prediction of behavior characteristics and tendencies of populations based on a sampling of observed terminals.

23 Claims, 11 Drawing Sheets

(56) References Cited

U.S. PATENT DOCUMENTS

2006/0166681 A1 7/2006 Lohbihler
2006/0250305 A1 11/2006 Coluzzi
2009/0140841 A1 6/2009 Meyer

* cited by examiner

SYSTEMS AND METHODS FOR GATHERING INFORMATION ABOUT DISCRETE WIRELESS TERMINALS

CROSS-REFERENCE TO RELATED APPLICATIONS

This application is a continuation-in-part of U.S. application Ser. No. 13/656,450, filed Oct. 19, 2012, which in turn is a continuation of U.S. application Ser. No. 12/463,138, filed May 8, 2009, now U.S. Pat. No. 8,315,598, the disclosures of which are incorporated in their entirety by reference herein.

TECHNICAL FIELD

The present invention relates generally to two-way wireless communications services, and more specifically to localized detection, location, and selective control of discrete two-way wireless terminals within determined three-dimensional boundaries of a defined local space ("DLS").

BACKGROUND

To artisans minimally skilled in wireless radio communication, it is well known that basic detection and subsequent location of a given continuously emitting wireless transmitter can be accomplished by merely connecting a radio receiver to one or more directional antennas and employing signal peaking methods. Such radio direction finding ("RDF") techniques have been used successfully over many years to locate ships, planes, and individuals in distress. Single-receiver techniques sometimes employ null measurements to improve the final precision of directional measurements, but such null measurements rely on adequate carrier-to-interference ratios and may also be compromised by multiple reflected signals ("multipath"). Even with the best directional antennas, single-receiver radiolocation platforms may indicate signal peaks or nulls that turn out to be from reflecting surfaces rather than the desired transmitter itself. Single-receiver techniques at best indicate that one or more transmitted signals exist within a general area without precise boundaries, due in part to the inverse-square-law asymptotic RF signal propagation characteristic of radio waves in free space.

Two-receiver radiolocation platforms provide only modest improvement over single-receiver arrangements. Multipath reflected signals from continuously emitting transmitters can significantly contribute to directional measurement error, and signal-strength boundaries remain poorly defined. Additionally, use of relative time of arrival ("RTOA") radiolocation techniques with only two synchronized receivers for locating digitally modulated RF transmitters will present nearly the same uncertainty as RDF directional measurements of continuously emitting RF transmitters. Two-receiver RTOA radiolocation platforms designed to locate such digitally modulated transmitters will, at best, predict which "disk" of circular area coordinates are possible for a given pair of RTOA values, with the disk being perpendicular to an imaginary line drawn between the two receivers, with the same poor definition of outer signal-strength boundaries.

Three-receiver synchronized radiolocation platforms with RTOA techniques for locating digitally modulated transmitters begin to offer the possibility of improved precision in both location and boundaries definition, in two dimensions only. The physical position of the three synchronized receivers defines the plane of the included two-dimensional area. Transmitters perpendicular to either side of the included two-dimensional plane will reintroduce increasing measurement error, with the same poor definition of outer signal-strength boundaries.

There are several group behavior sampling methods widely used in market research, traffic/crowd analysis and control, retail property management, and similar applications. Typical methods include various combinations of visible human observers, video systems, counting devices, portable scanners linked to a computer system, and similar technologies, to name a few. For group behavior sampling, most existing methods suffer from a relatively low sample rate, observation periods that may or may not coincide with periods of significant changes in behavior, the undesirable effect of the observer's presence influencing behavior in some way that contaminates measurement, and the scope being typically limited to one or just a few points of observation. Observation performed by an individual or a team can be "spotted" or out-maneuvered. Additionally, multiple observers face the challenge of coordinating observations to avoid duplication or other errors that could contaminate the accuracy, precision (or both) of the end result.

Current methods for tracking individuals suffer from many of the same limitations of typical methods used to sample group behavior in defined environments. Additionally, use of so-called intrusive "tracking" devices raises issues of permission, privacy intrusion and potential legal hurdles.

Secure access to buildings and other types of sensitive property typically requires physical keys/access cards that must be produced, distributed and recovered (or electronically disabled) from individuals. Unauthorized copies of keys and access cards can often be made without knowledge and permission of the issuing entity, and multiple levels of security with traditional secure access methods are often mutually exclusive. Taken together, such limitations can effectively obviate actual secure access and virtually always impose high administrative costs for what often turns out to be a relatively low level of actual security.

Certain businesses and other DLS facilities such as theaters, restaurants and churches have attempted to effect "quiet zone" environments by posting notices and/or verbally requesting customers or members to switch off or silence such terminal devices during their presence in the facility. Other facility operators have been reported to engage in the use of illegal "jamming" devices that effectively interdict all wireless terminal devices within facility premises. This method has the additional perverse effect of totally denying electronic access to certain exempt customers or members such as doctors or emergency services personnel, who may need to be instantly notified in the event of medical emergencies and threats to life or property. In this particular scenario, attempts at outgoing communication sessions would also be completely denied because the "jammed" wireless terminal would be unable to initially establish the required two-way session through the overhead "handshaking" protocol of the particular service. Absent some notice by the facility operator, interdiction by illegal jamming techniques would not likely be obvious to visitors with wireless terminals—the wireless terminal device would simply be non-functional without one's knowledge.

The limitations of present methods typically employed in sampling group behavior, tracking individuals, providing secure access, and controlling two-way wireless terminal alerts and operation are generally known by the operators of various DLSs and other entities. Certain methods, while extremely effective (i.e., "jamming"), have the distinct drawbacks of being illegal and/or denying electronic access to critical personnel without their knowledge. As such, a need exists for systems and methods to effectively and legally overcome such limitations in DLS environments. A particular need exists for systems and methods which overcome known limitations of certain applications and enable new services and features not anticipated by current wireless service delivery platforms or other approaches. To this end, systems and methods are desired which realize one or more of the following advantages: improved sampling precision; reduction of sampling inaccuracy; elimination of personal privacy intrusion; improved secure facility access at lower administrative cost; selective local control of two-way wireless terminal alerts and operation within the DLS; automatic control of DLS systems or subsystems such as security cameras; and remote control of systems and subsystems outside DLS boundaries.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present invention summarized above and defined by the enumerated claims below may be better understood by referring to the following detailed description, which should be read in conjunction with the accompanying drawings. This detailed description of the exemplary embodiments is not intended to limit the enumerated claims, but to serve as particular examples thereof. In addition, the phraseology and terminology employed herein is for the purpose of description, and not limitation.

Figure 1:
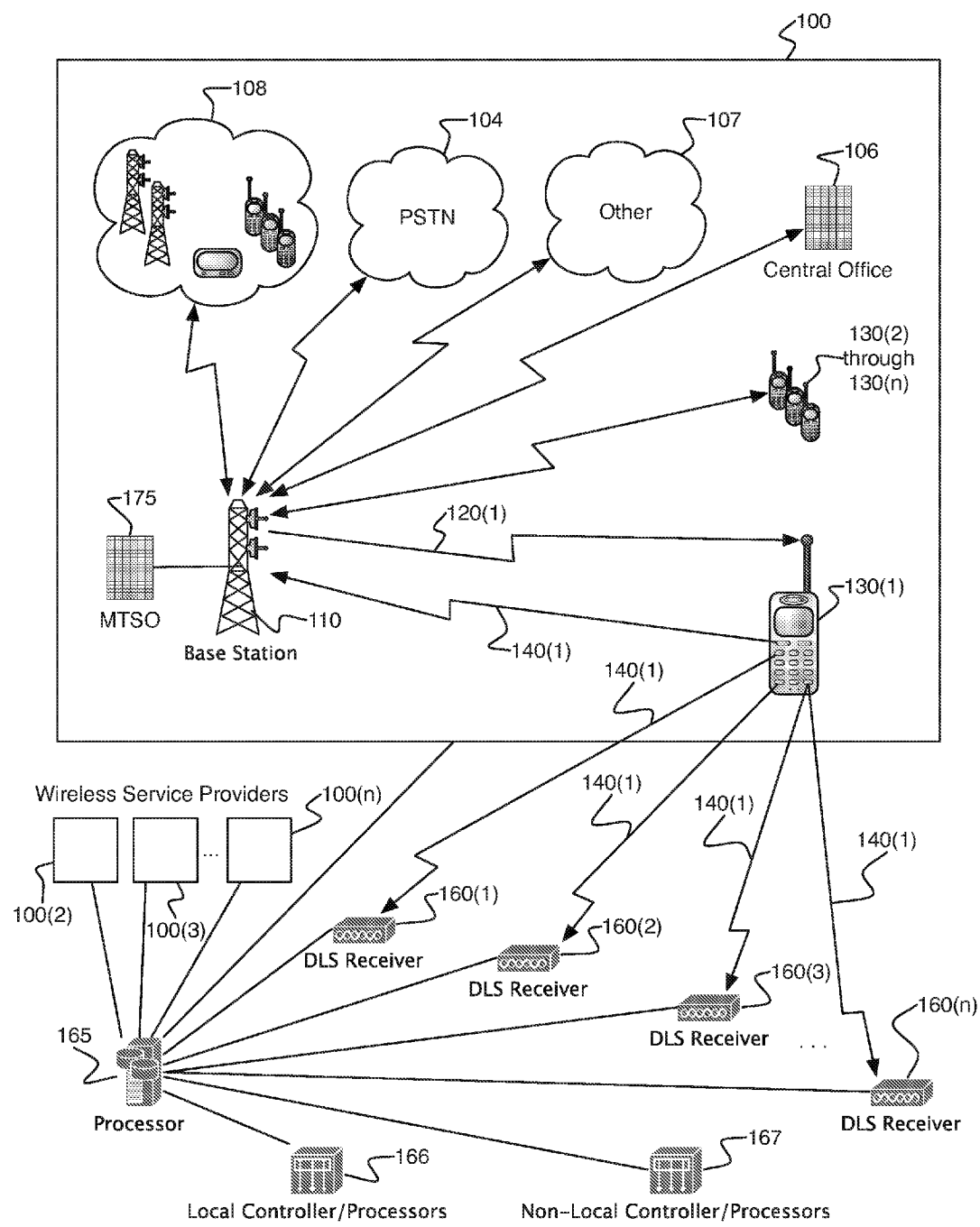
FIG. 1 is a diagrammatic depiction of a typical wireless communications network architecture, also referred to as a wireless communications system, for practicing aspects of the present invention.

With the above in mind, initial reference is now made to FIG. 1 which illustrates a wireless communication network architecture, in the form of a typical cellular telephone wireless service provider system 100, which may be used to practice aspects of the present invention. System 100 includes a base station 110 that transmits routine communication continuity "ping" or request signals 120(1) to two-way wireless terminal 130(1). Base station 110 is typically a cellular or other similar wireless radio frequency (RF) transceiver base station known by those skilled in the art. Base station 110 is also typically in communication, via a wireless or wired coupling, through none, one, or more base stations, cells, or other devices 108, to a switching station or central office 106, and, in turn, to the public switched telephone network (PSTN) 104 or other data network 107.

Base station 110 typically uses an RF overhead signaling channel to establish, supervise, and terminate voice or data communication sessions with two-way wireless terminals 130(1)-13(n) in system 100. Using the overhead RF channel, base Station 110 is typically in automatic repetitive two-way contact with each two-way wireless terminal 130(1)-13(n) within the serving area of system 100, performing a variety of administrative functions in the overhead RF spectrum, such as authentication, verification, detection of illegal "cloned" cell phones, identification of "roaming" users, and assessing the point at which a given active communication session needs to be handed off to the next cell in the system 100.

Request or ping signal 120(1) is transmitted in the overhead RF channel. Signal 120(1) modulates the RF link by using various modulation techniques, including, for example, Time Division Multiple Access (TDMA), Code Division Multiple Access (CDMA), Coded Orthogonal Frequency Division Multiplexing (COFDM), GSM, G3, the disclosures of which are hereby incorporated by reference in their entireties, and other similar modulation techniques well known to those skilled in the art. As also known in the art, signal 120(1) includes an identifier, flag, or other information 122(1) that is unique to a particular end user two-way wireless terminal, such as representative wireless terminal 130(1) in FIG. 1. As such, end user two-way wireless terminal 130(1) can discern that the request or ping signal 120(1) is for that particular end user two-way wireless terminal 130(1), as opposed to other two-way wireless terminals 130(2)-13(n) on the system 100.

Each end user two-way wireless terminal 130 may be, for example, a cellular telephone, pager, PDA, BlackBerry, or other similar wireless voice, data or multi-media communication device. Such two-way wireless terminals routinely emit RF return path signals toward base stations, even when no information communications session is in progress. In the event that two-way wireless terminal 130(1) is on and operational, upon receipt of request or ping signal 120(1), two-way wireless terminal 130(1) transmits an associated reply in the form of an automatic return signal 140(1) back to base station 110. Return signal 140(1) is generally transmitted in the administrative overhead RF channel, and is typically transmitted before any notification to the end user (e.g., before the two-way wireless terminal rings or vibrates, etc., and before the request for communication is "answered" by the end user).

Return path signals contain overhead information unique to the particular two-way wireless terminal, thereby also allowing localized detection, location and indirect control of specific end-user terminals within buildings, campus locations and other types of DLS facilities. Additionally, such locally obtained return path information may be used to control other intra- and extra-DLS systems or subsystems such as surveillance cameras. Return Signal 140(1) contains a unique TID/ESN 142(1) of the two-way Wireless Terminal 130(1) that received request or Ping Signal 120(1). TID/ESN 142(1) is used by Mobile Telephone Switching Office (MTSO) 175 to process the communication request. If there is no Return Signal 140(1) (including TID/ESN 142(1)) forthcoming from two-way Wireless Terminal 130(1), MTSO 175 assumes that two-way Wireless Terminal 130(1) is either switched off, not operational, and/or out of RF range of System 100. In such case, the calling party may be routed to voice mail, or to a standard network recording, depending on defined service option.

Although return signal 140(1) with the embedded TID/ESN 142(1) is intended for receipt only by base station 110 and MTSO 175 in system 100, it is also possible for other devices near two-way wireless terminal 130(1) to also receive return signal 140(1), typically in the RF spectrum. Thus, in accordance with the present invention, an array of synchronized DLS receivers, generally 160(1)-16(n) also receive return signal 140(1), and obtain the TID/ESN 142(1) information unique to two-way wireless terminal 130(1) within the DLS through decoding by processor 165 for the purpose of recovering TID/ESN 142(1) from return signal 140(1).

Synchronized DLS receivers 160(1)-16(n) are programmed to recognize terminal-specific TID/ESN 142(1)-142(n) transmitted from multiple two-way wireless terminals 130(1)-13(n) associated with multiple wireless technologies, within the DLS. Processor 165 associated with multiple synchronized DLS receivers 160(1)-16(n) detects, time stamps, determines exact intra-DLS physical location and prepares dynamic database for possible uploads to respective wireless service provider system 100, or other systems for active two-way wireless terminals 130 within DLS boundaries.

Processor 165 may be electromagnetically connected to a plurality of respective wireless service provider systems 100(2)-10(n) that have an RF "presence" within the DLS. Even for applications that do not involve indirect control of two-way wireless terminals 130, user-aware features and functions such as "silent" ringing or the on/off state of the terminal device, a given application may require an increased ping rate, perhaps to improve the precision of radiolocation within the DLS. Such increase in ping rate could be effected by uploading TID/ESN 142 information detected within a DLS to respective wireless service provider systems 100. If standard ping rate from wireless service provider systems 100 is satisfactory for the application and no indirect control of a two-way wireless terminal 130 is required, no communication from the DLS to associated system is required. Finally, and as also illustrated in FIG. 1, processor 165 may also be electromagnetically connected to DLS local controllers/processors 166 and non-local (remote) controllers/processors 167 to control systems and subsystems such as secure facility access, security cameras and the like.

Figure 2A:
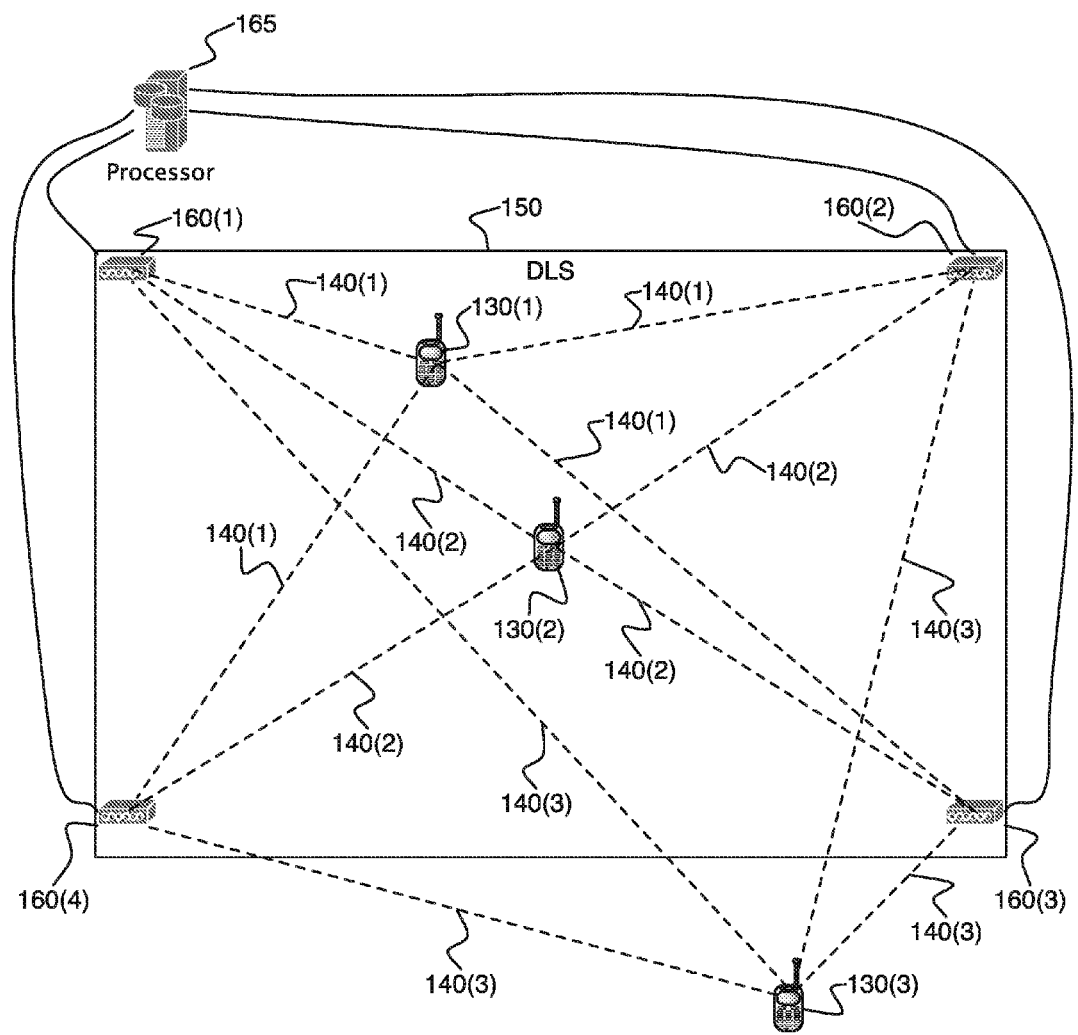
FIGS. 2a and 2b provide a diagrammatic view of one approach for practicing the present invention in an application that does not involve any direct or indirect control of two-way wireless terminal devices in a DLS environment.
Figure 2B:
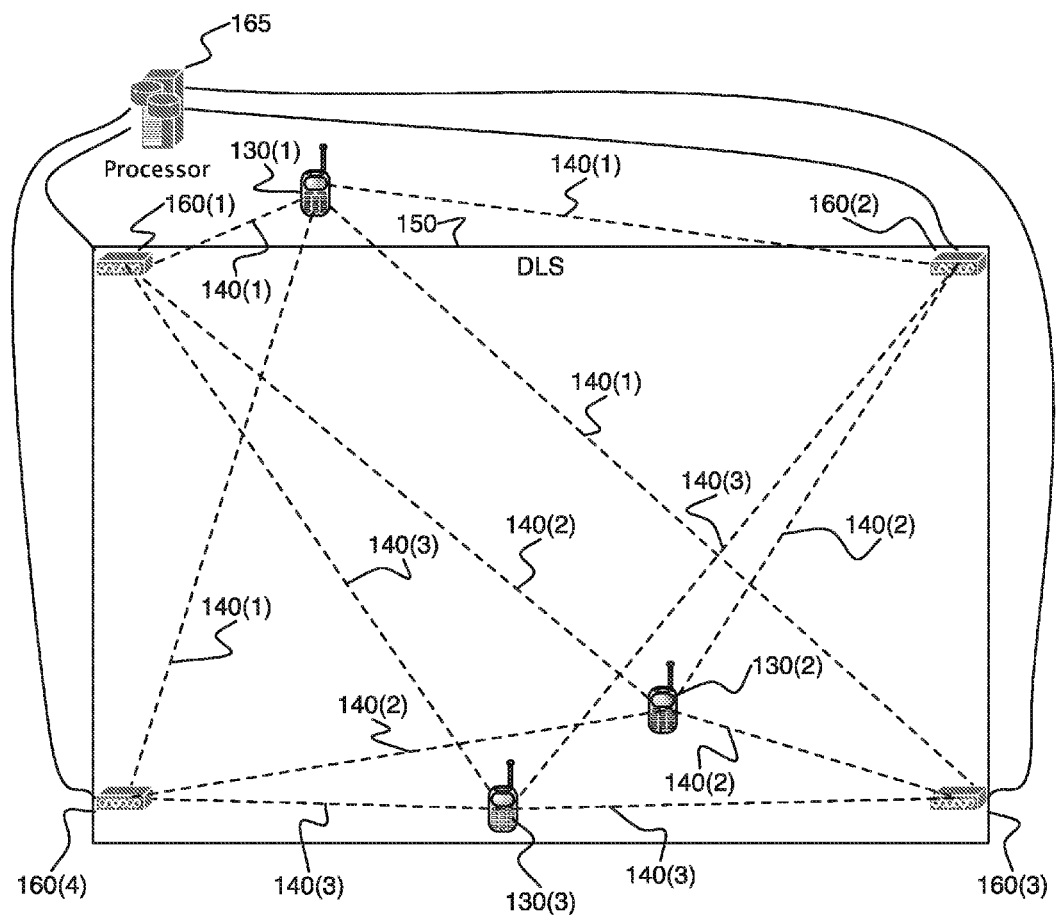

Turning now to FIGS. 2a and 2b, one approach for practicing the present invention for an application that does not involve any control of two-way wireless terminal devices 130 in a DLS environment is shown. The array of DLS receivers, generally 160, and their associated processor 165 detect and locate the specific physical position of all active two-way wireless terminals 130 within the DLS 150. Active two-way wireless terminals 130 outside DLS 150 are exempt from processing. DLS receivers 160 and associated processor 165 taken together include automatic radiolocation capability. Intra-DLS radiolocation of discrete two-way wireless terminals 130 is accomplished by relative time of arrival calculations, for all detected discrete TID/ESNs 142 of all terminal technologies that have an RF "presence" within the DLS 150. Here, a plurality, and preferably four or more, synchronized DLS Receivers 160(1)-160(4) are placed and connected together to processor 165, with relative physical distance calibration values obtained from actual placement of individual DLS receivers 160(1)-160(4). The connection to processor 165 can, of course, be accomplished through any of a variety of wired or wireless means. The resulting set of possible relative RF propagation time delays among all DLS receivers 160(1)-160(4) for all points within the three-dimensional region in a particular DLS allows immediate calculation by processor 165 of the specific physical location of two-way wireless terminals 130(1) and 130(2) within the DLS, and the immediate exclusion of two-way wireless terminal 130(3) that happen to be outside the boundaries of the DLS.

It can be appreciated, then, that the illustration of FIG. 2a corresponds to a first time interval during which each of receivers 160(1)-160(4), which comprise receiver array 160, intercepts associated return signals 140(1)-140(3) which is, respectfully, associated with wireless terminals 130(1)-130(3). Recall that each return signal might be responsive to a ping request transmitted in the overhead RF channel from an associated base station. The intercepted signals correspond to a first sampling of signals transmitted by an associated set of two-way wireless terminals within the DLS during the first time interval. It can be appreciated, then, that return signal 140(3) which is broadcast from a two-way wireless terminal 130(3) outside DLS 150 will fall outside the allowable set of possible DLS relative time delays, and any further calculation of physical location, counting, and all other application parameters may be aborted. Although a different physical architecture, it is such calculation of relative time of arrival of radio signals that make possible the Global Positioning System ("GPS") location capability. The DLS architecture and the present radiolocation method enable many disparate applications that require individual active two-way wireless terminal 130 physical position tracking within a DLS. In any event, the network architecture can, thus, ascertain that the first set of wireless terminals within the DLS during the first time interval only includes terminals 130(1) and 130(2). Initial location information can, thus, be logged for these two wireless terminals.

FIG. 2b illustrates a second time interval during which it may be seen that wireless terminal 130(3) has now moved into DLS 150, while wireless terminal 130(1) is now outside DLS 150. Accordingly, when the wireless terminals transmit their reply signals, these are intercepted by the synchronized DLS receivers 160(1)-160(4) as a second sampling of signals. This information is then transmitted to processor 165 which is able to ascertain that an associated second set of wireless terminals within the DLS now corresponds to terminals 130(2) and 130(3), but not 130(1). Here again, subsequent location information can now be logged for this second set of wireless terminals that are present within the DLS during the second time interval. The DLS architecture can thereafter compare the initial location information to the subsequent location information to ascertain tracking movement of the wireless terminals within the DLS, namely, that wireless terminal 130(1) has moved out of the DLS while wireless terminal 130(3) has moved into the DLS. It should be appreciated that FIGS. 2a and 2b illustrate a very simplistic version of events which can be monitored to ascertain movement of wireless terminals into and out of a given DLS. Of course, this foundation can be used to gather information pertaining to any of a variety of movement scenarios for a variety of DLS regions.

Figure 3A:
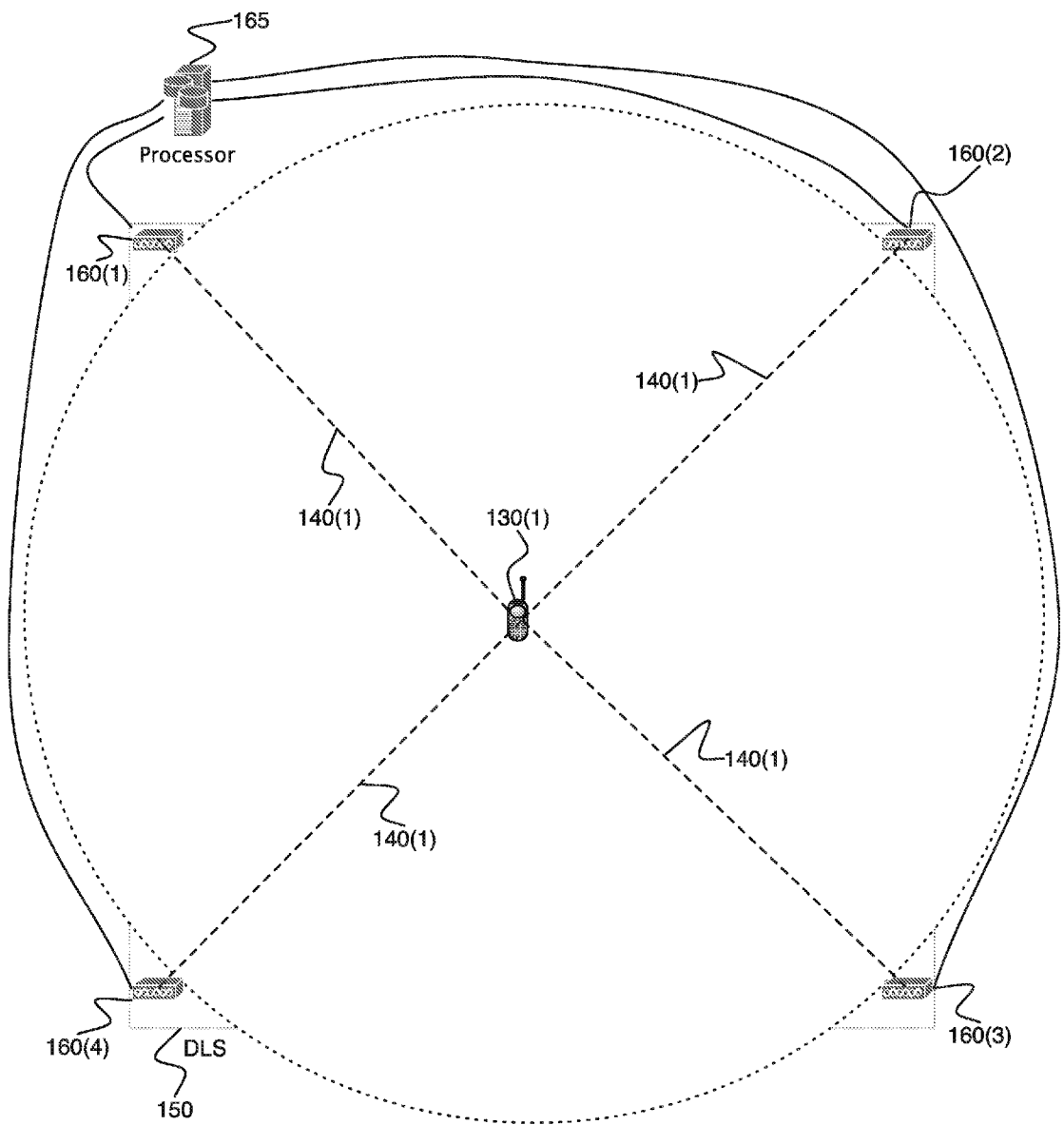
FIGS. 3a and 3b demonstrate in two dimensions a diagrammatic view of the method for practicing the present invention.
Figure 7:
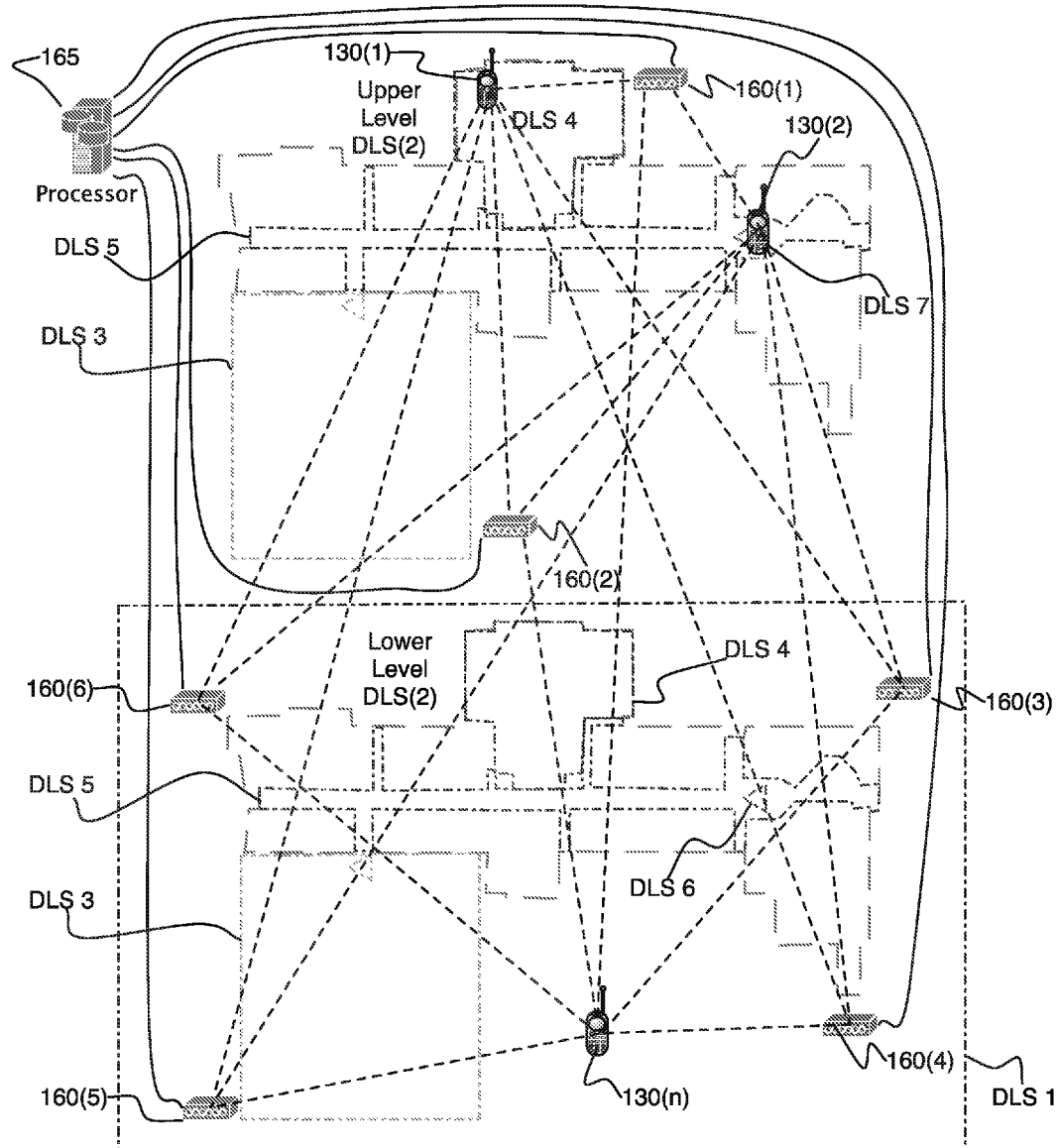
FIG. 7 illustrates a multi-DLS example environment using a representative DLS Receivers/Processor platform to create discrete sub-DLSs within a master DLS; and, FIGS. 8a and 8b illustrate different embodiments of an information gathering method according to the teachings herein.

Turning now to FIG. 3a, the radiolocation method is specifically illustrated. FIG. 3a is drawn in only two of the three dimensions to teach the radiolocation method with better clarity. The radiolocation method illustrated in FIG. 3a comprises a multiplicity of synchronized DLS receivers 160(1)-160(4) connected to a common processor 165, using relative time of arrival of modulated return-path signals 140(1) containing TID/ESN information to calculate the physical position of detected two-way wireless terminals in a DLS 150. Here, two-way wireless terminal 130(1) is located exactly equidistant from all four synchronized DLS receivers 160(1)-160(4). All synchronized DLS Receivers 160(1)-160(4) will, thus, receive the modulated return signal 140(1) at exactly the same instant in time, and processor 165 will calculate and report the position of said two-way wireless terminal 130(1) at only one possible position at the exact center in the area of a regular, two-dimension, four-sided polygon of the simplified illustration. If the four synchronized DLS receivers 160(1)-160(4) are respectively arranged instead to become the points of an equilateral tetrahedron (a four-sided pyramid) and they all receive modulated return signal 140(1) at the same instant in time, two-way wireless terminal 130(1) is now reported by processor 165 to be at the exact center of the three-dimensional space within the pyramid. Accordingly, there is one and only one set of coordinate values for each physical point within the three-dimensional space of a given DLS 150. Synchronized DLS receivers 160(1)-160(4) and non-zero relative time of arrival calculations by processor 165 allow accurate dynamic radiolocation of each two-way wireless terminal in near real-time for all other possible points within the DLS 150, as well. This deterministic radiolocation method allows for the creation of a hierarchy of DLSs, permitting, for example, multiple unique DLSs for each store within a multi-tenant shopping mall, including common areas such as parking lots, walkways and multiple levels or stories, as shown in FIG. 7.

Figure 3B:
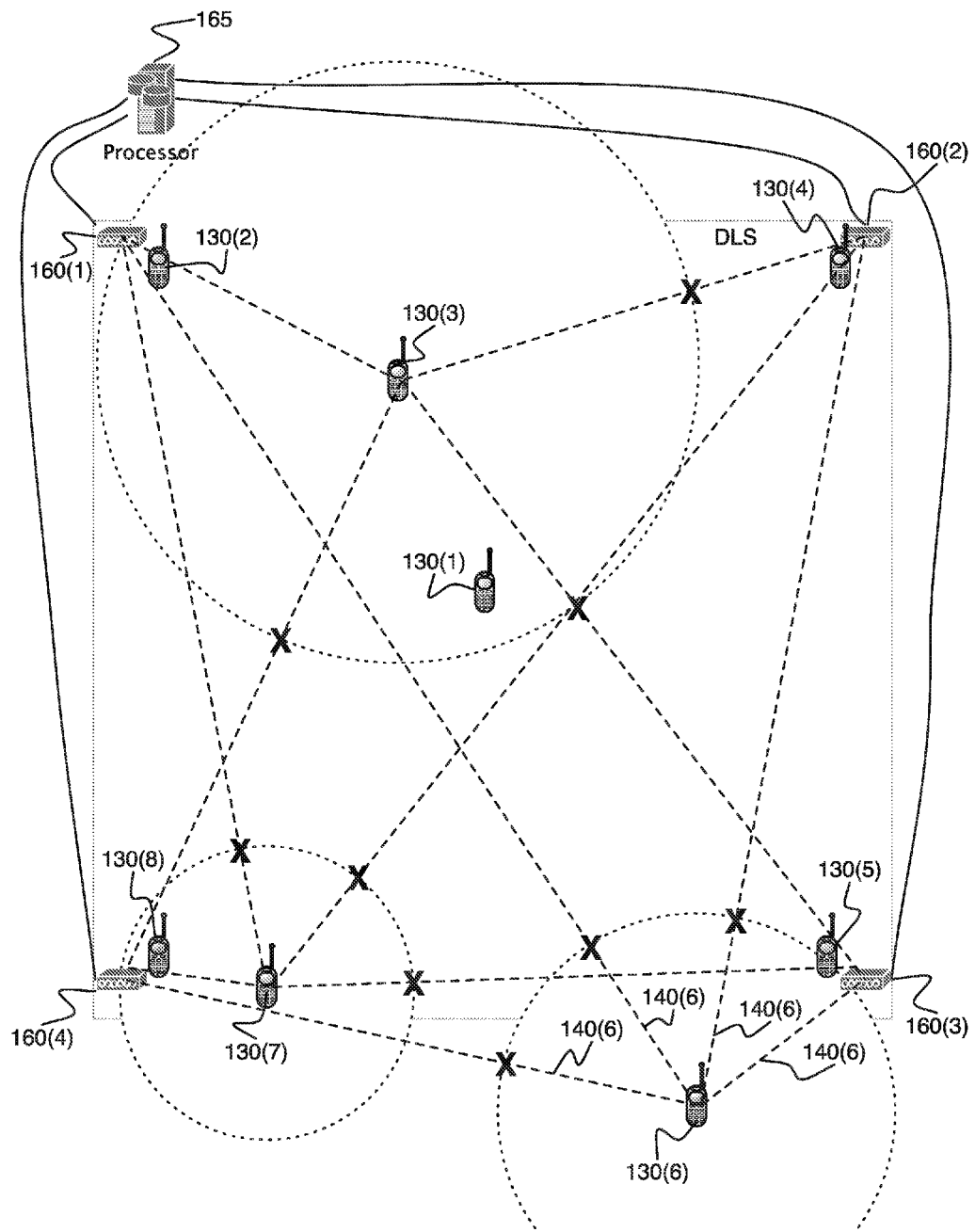

Turning now to FIG. 3b, the radiolocation method is illustrated for a multiplicity of other two-way wireless terminals 130(1)-130(8). Two-way wireless terminals 130(3), 130(6), and 130(7) are shown with dashed lines drawn to each of the four synchronized DLS receivers 160(1)-160(4). Two-way wireless terminals 130(1), 130(2), 130(3), 130(4), 130(5), 130(7), and 130(8) are physically within DLS 150, and two-way wireless terminal 130(6) is physically located outside DLS 150. The modulated return signal 140(6) from two-way wireless terminal 130(6) arrives first at DLS receiver 160(3), then slightly later in time at DLS receiver 160(4), then even later at DLS receiver 160(2), and lastly in time at DLS receiver 160(1). Processor 165 calculates the relative time of arrival ("RTOA") information from the multiplicity of synchronized DLS receivers for modulated return signal 140(6) and determines the location of two-way wireless terminal 130(6) to be outside the range of predetermined three-dimension coordinate values of DLS 150. Calculation of RTOA information from all other two-way wireless terminals 130 within DLS 150 by processor 165 allows the determination of exact location of each terminal at one and only one location within the DLS at any given instant in time.

Further, there is virtually no possibility that a wireless terminal 130(1) signal from any other point outside a DLS will produce the same RTOA data set corresponding to a point within predetermined DLS coordinate values, as a potential external alias of any given point within a DLS. A simple example can be used to demonstrate how aliasing common to two-dimension radiolocation methods is completely obviated by three-dimension DLS deterministic radiolocation in the present invention. For the example, a wireless terminal 130(1) previously located at the exact center of the three-dimensional space within a tetrahedron (with no signal RTOA difference among all four synchronized receivers) is instead relocated to a physical point outside one of its four plane faces. Such example outside point is selected at the same physical distance outward from the plane face that exactly mirrors the original distance from the plane face inward to the exact center of the tetrahedron. The signal from the example outside-relocated wireless terminal 130(1) will now arrive at three of the four synchronized Receivers 160(1)-160(4) located at three corners of the plane face with no relative time difference of signal arrival, and at a later signal arrival time at the fourth synchronized receiver located at the vertex opposite the plane in the example. The resulting four-receiver non-zero RTOA data set for the example now falls outside the range of RTOA defined coordinate values for the example DLS within the tetrahedron. The external potential alias point is thus properly excluded from further consideration by processor 165, and in reciprocal fashion, there is no internal DLS alias possible for any wireless terminal 130(1) that happens to be external to the DLS.

Potential location mistakes associated with other radiolocation methods that use one of or both of received signal strength and relative carrier phase are also effectively eliminated by three-dimension DLS deterministic radiolocation in the present invention. The DLS synchronized receiver array is designed to accept all signal strength levels within a wide maximum-to-minimum signal level dynamic range for each of the matched receivers. Within a designed signal strength dynamic range, all signals within a DLS are candidates for further RTOA examination by processor 165. Relative carrier phase measurements beyond one wavelength are also very likely to introduce potential location calculation mistakes due to multipath reflections from a variety of physical objects and flat surfaces. The use of three-dimension RTOA effectively eliminates location errors by accepting signals within a broad range of signal levels and simply ignoring all signals that appear later in time than the first four to arrive at synchronized DLS Receivers 160(1)-160(4).

Figure 4:
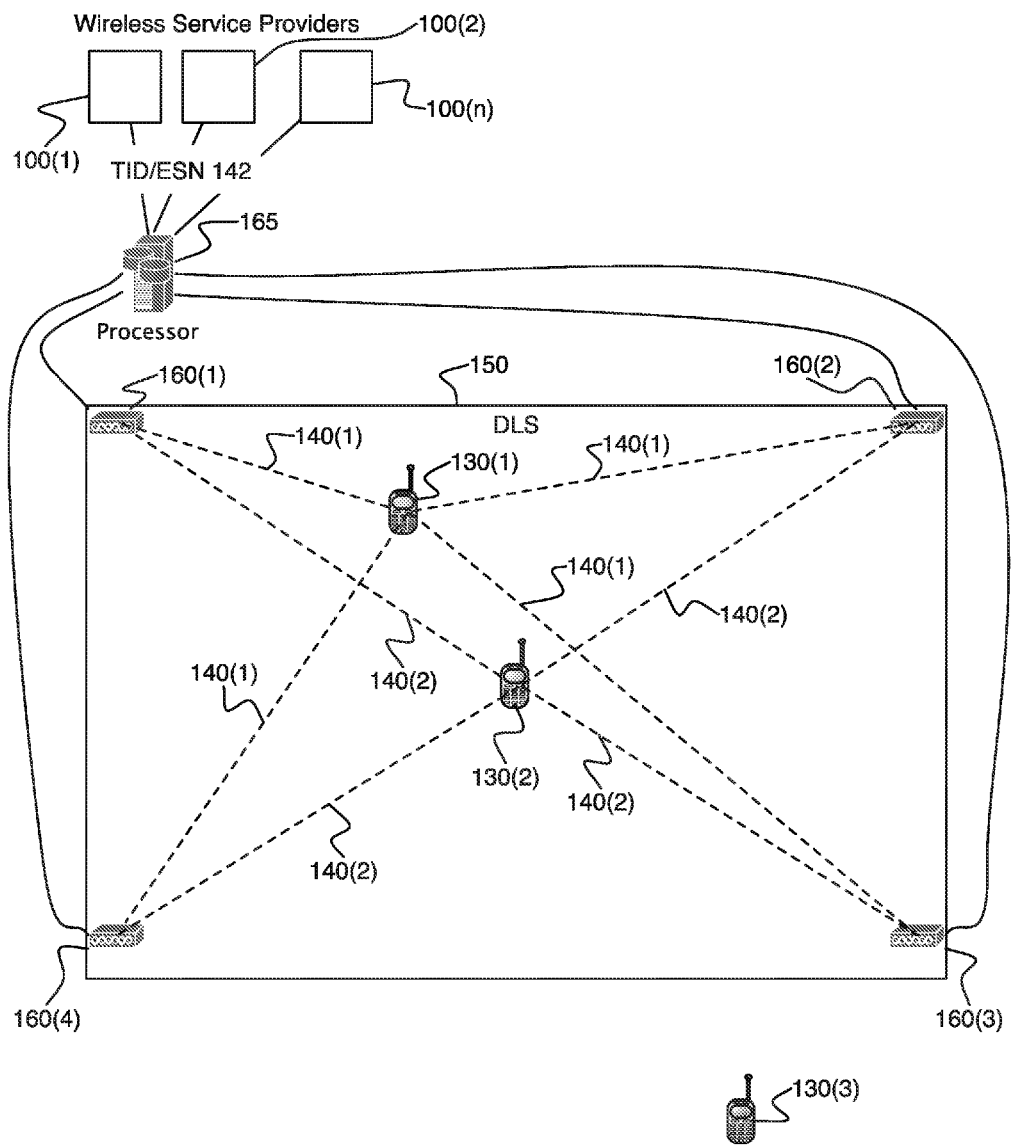
FIG. 4 is a diagrammatic view for illustrating one embodiment of an approach for practicing the present invention in an application that does involve indirect control of features and functions of one or more two-way wireless terminal devices in a DLS environment.

Turning now to FIG. 4, one embodiment of an approach is now depicted for practicing the present invention in an application that involves indirect control of features and functions of one or more two-way wireless terminals in a DLS environment. As in the previous embodiment, DLS Receivers 160(1)-160(4) and associated processor 165 detect and specifically locate all two-way wireless terminals 130 of all wireless customers within the DLS 150. Processor 165 is programmed to also upload to respective wireless service providers 100(1)-100(n) the TID/ESNs of all two-way wireless terminals 130(1)-13(n), respectively, detected within DLS 150, with instructions to silence and/or deny service to said terminals (except for outgoing E911 emergency calls) that are detected within DLS "quiet zones," for example, wireless terminals 130(1) and 130(2) here. For purposes of this example, the "quite zone" could correspond to the geometry of the DLS 150, itself. However, the ordinarily skilled artisan would also appreciate that the quite zone could be a particular subset space or spaces, within the DLS 150. The embodiment of FIG. 4 would understandably require a prior arrangement between the DLS entity 150 and all wireless service providers 100(1)-10(n) that have an RF "presence" within the DLS 150 desiring to establish such area-specific "quiet zones."

Figure 5:
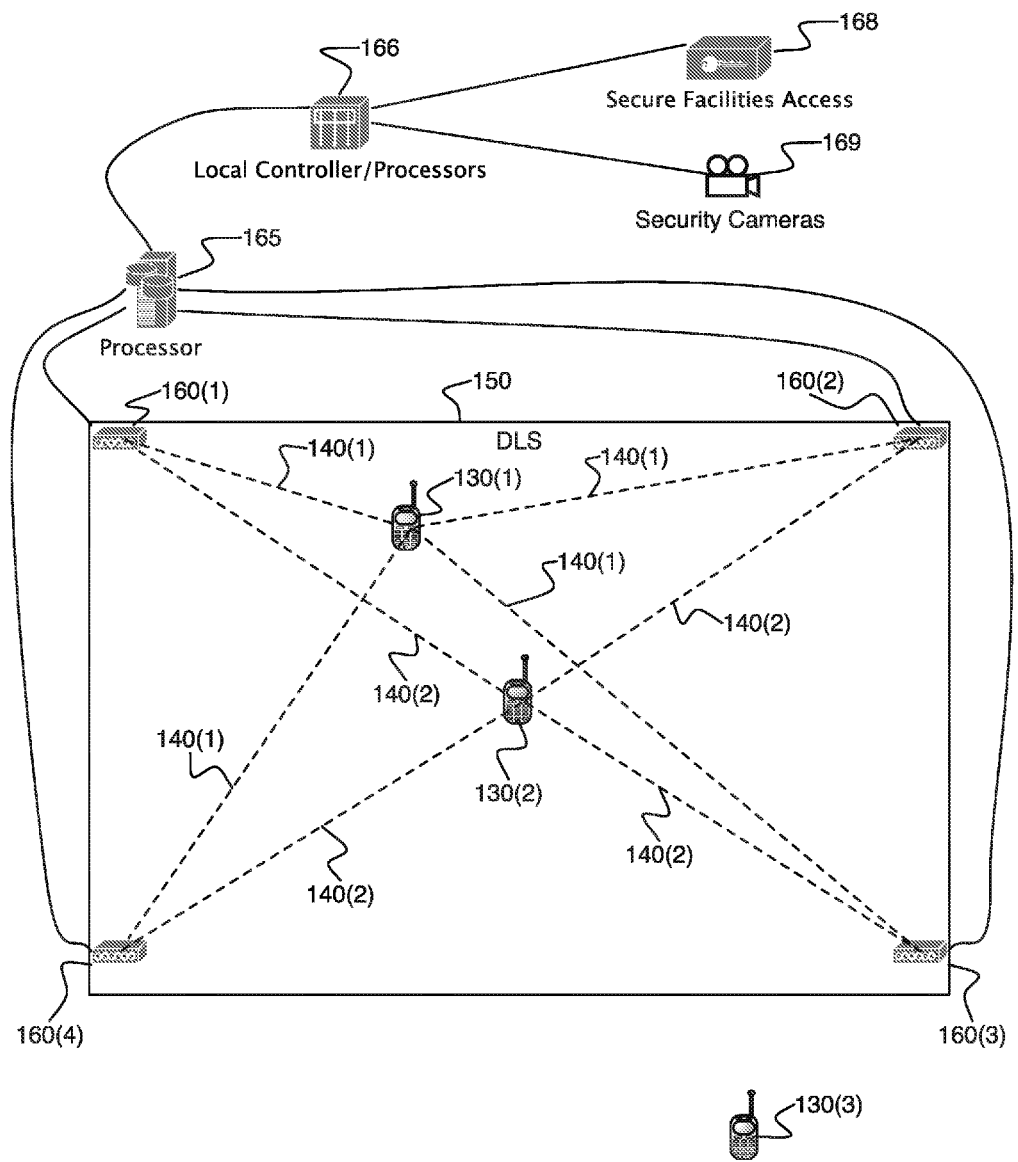
FIG. 5 is a diagrammatic view for illustrating one embodiment of an approach for practicing the present invention in an application that involves local-only limited control of DLS systems or subsystems according to specific two-way wireless terminals detected within the DLS.

Turning now to FIG. 5, one approach for practicing the present invention in an application that involves local-only limited control of DLS systems 150 or subsystems 168 and 169 according to specific two-way wireless terminals 130 detected within the DLS 150 is shown. Here, discrete two-way wireless terminals 130(1) and 130(2) that are detected and located by the DLS receiver array 160 and processor 165 provide input to local controllers/processors 166 of systems and subsystems only within DLS boundaries. Such local controllers/processors 166 may be used to control systems and subsystems such as secure facility access 168, security cameras 169, and the like. Rather than relying only on facial recognition in the situation of manually operated security cameras, this application enabled by the present invention would automatically and accurately "tag" a suspect with a self-training camera linked to a detected TID/ESN.

Figure 6:
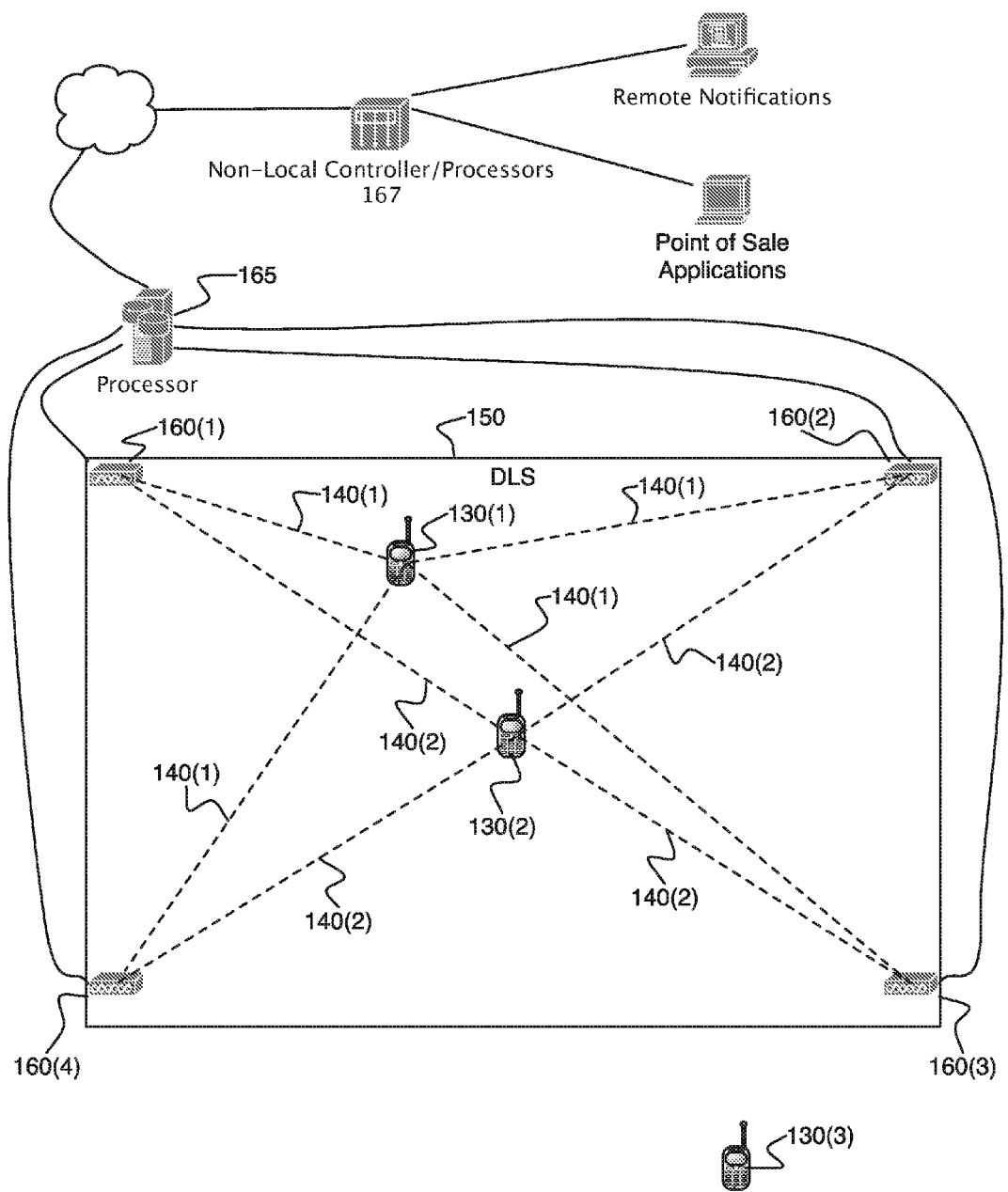
FIG. 6 illustrates one approach for practicing the present invention in an application that involves remote control of systems or subsystems outside DLS boundaries.

Turning now to FIG. 6, one embodiment of an approach for practicing the present invention in an application that involves remote control of systems or subsystems outside DLS boundaries is shown. Similar to the previous approach enabling the example local DLS application, this approach provides detected and processed information from within a DLS to other non-local controller/processors 167. Applications of such an embodiment include automatic remote notification of the appearance of a TID/ESN within another non-contiguous DLS location, such as among multiple satellite locations of a geographically diverse entity. Yet another extra-DLS application could require electronic association of a credit card number with detected customer TID/ESN before a point-of-sale transaction is remotely authorized.

Turning now to FIG. 7, one example of a multi-DLS environment using a common DLS receivers/processor platform to create discrete sub-DLSs within a master DLS is shown. Since all possible coordinate values for the three-dimensional space within a master DLS can be established, discrete sub-DLSs can also be established as defined exclusive subsets of master DLS coordinate values. A minimum of four synchronized DLS receivers 160 in a master DLS are required to establish any particular point in the included space of a defined sub-DLS, and the coordinate values will not be repeated in any of the remaining defined sub-DLSs within the master DLS. The example illustrated in FIG. 7 employs six synchronized DLS Receivers which comprise array 160(1)-160(6), but a greater number may be required for complete coverage of complex DLS environments. It will be obvious to those skilled in the art that the present invention may also be used in a variety of other similar DLS applications, including, for example, time-stamping specific TID/ESNs in specific areas of a DLS, for the purpose of identifying an unauthorized person.

Figure 8A:
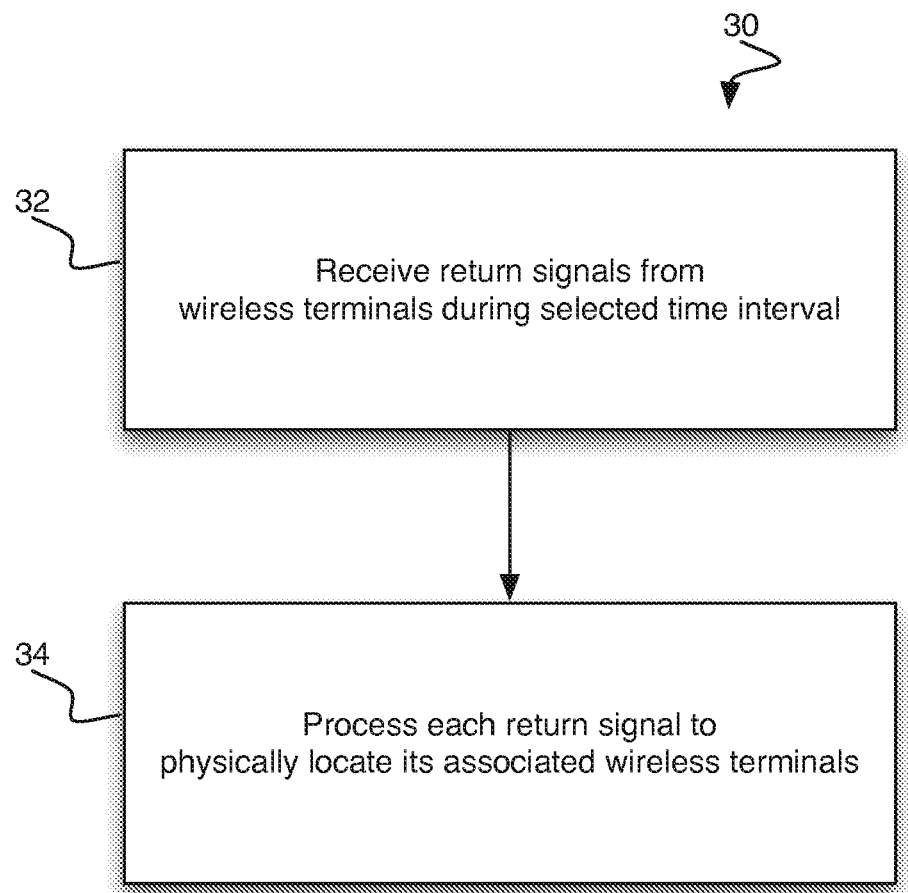

With the above description in mind, it may be appreciated that various methods are contemplated for gathering information. According to a broad version of a methodology 30 as shown in FIG. 8*a*, return-path signals that are transmitted from two-way wireless terminals within a DLS are received at 32 over a selected time interval and thereafter processed at 34 to ascertain physical location information about each signal's associated two-way wireless terminal within the DLS.

Figure 8B:
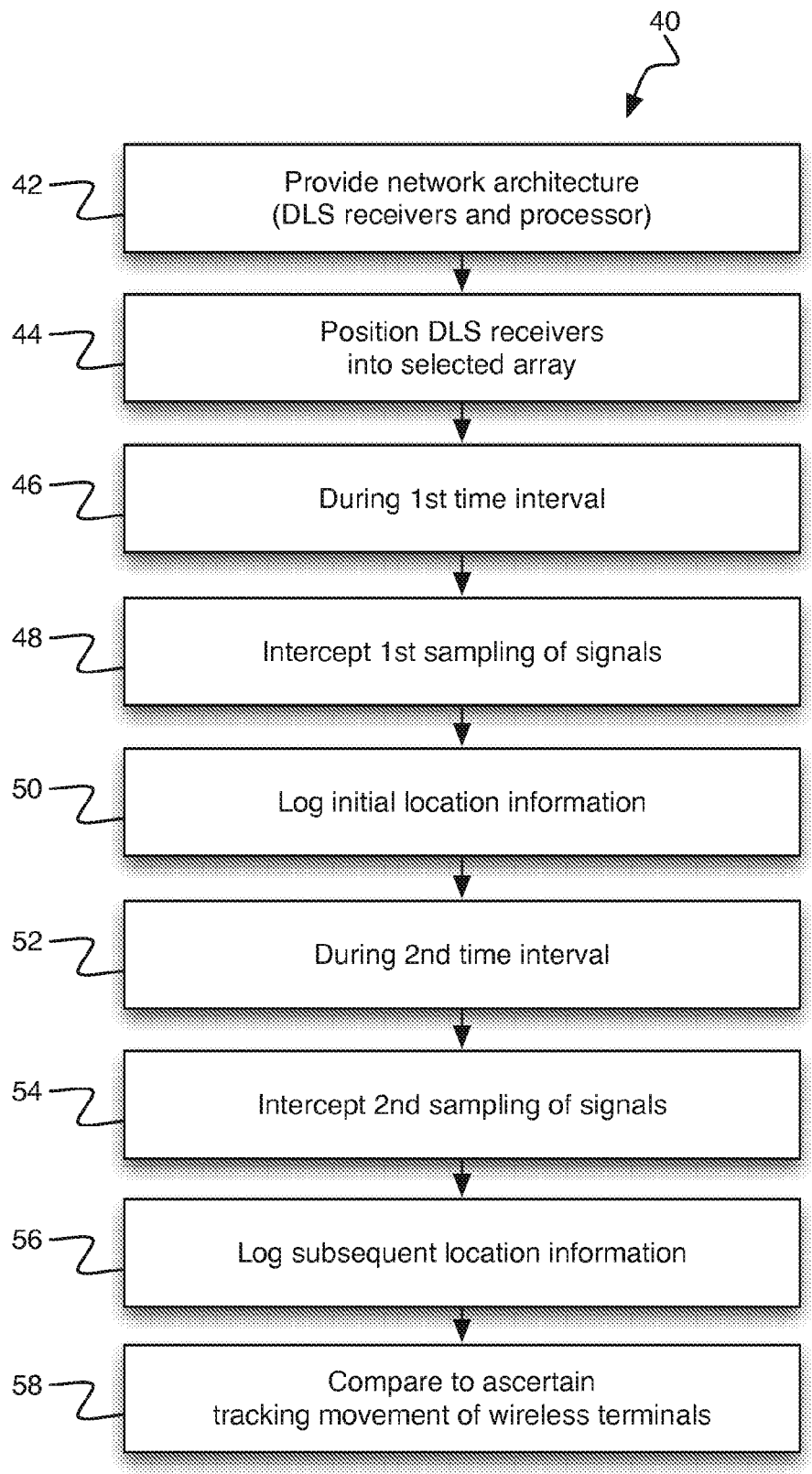

A more detailed, non-intrusive information gathering method 40 is diagrammed in FIG. 8*b*. Here, a network architecture is provided at 42. The network architecture includes a plurality of synchronized receivers and at least one processor, as discussed above. At 44, the receivers are positioned in a selected array to define the DLS. During a first time interval at 46, a first sampling of signals is intercepted by the receivers at 48. This first sampling of signals, as discussed above, is that which is transmitted by an associated first set of two-way wireless terminals within the DLS, with each received signal being associated with a particular one of the wireless terminals during the first time interval. At 50, initial location information is logged for the first set of wireless terminals. Thereafter, during a second time interval 52, a second sampling of signals is intercepted at 54, and subsequent location information is logged at 56 corresponding to the set of wireless terminals within the DLS during the second time interval. Then, at 58, the initial location information is compared to the subsequent location information to ascertain tracking movement of wireless terminals within the DLS.

Accordingly, the present invention has been described with some degree of particularity directed to the exemplary embodiments thereof. It should be appreciated, though, that the present invention is defined by the following claims construed in light of the prior art so that modifications or changes may be made to the exemplary embodiments of the present invention without departing from the inventive concepts contained herein.

What is claimed is:

1. A system for monitoring movement of two-way wireless terminals within a defined local space (DLS), the system comprising:
   a mathematically characterized defined local space (DLS) architecture, including:
   i) an array of at least four receivers that together identify a volume of the DLS;
   ii) at least one processor in communication with the array of receivers;
   the array of at least four receivers being operable with:
   i) at least one two-way wireless terminal; and
   ii) wherein the at least one two-way wireless terminal is operable with a base station, the base station being associated with a wireless service provider system, the base station being operable to periodically broadcast a series of request signals, the request signals being intended for one or more of the at least one wireless terminal;
   wherein the DLS architecture is operable:
   i) during a first time interval to:
      (1) determine a first sampling of return signals intercepted with the array of at least four receivers, the first sampling of return signals transmitted by at least a first wireless terminal of the at least one wireless terminal while physically within the DLS during the first time interval in response to one or more of the request signals; and
      (2) log initial location information for the at least first wireless terminal within the DLS based on the first sampling of return signals;
   ii) during subsequent time intervals to:
      (1) determine at least one subsequent sampling of return signals intercepted with the array of at least four receivers, the at least one subsequent sampling of return signals being transmitted by the first wireless terminal while physically located within the DLS during one or more of the subsequent time intervals in response to one or more of the request signals; and
      (2) log subsequent location information for the first wireless terminal within the DLS based on the at least one subsequent sampling of return signals; and
   iii) to compare said initial location information to said subsequent location information to ascertain tracking movement of wireless terminals within the DLS.

2. A system according to claim 1 wherein each request signal is a service request or ping signal transmitted by the base station in an RF signaling channel, and wherein each request signal includes identifying information that is unique to a particular one of the at least one wireless terminals, thereby causing only the corresponding wireless terminal to transmit the correspondingly intercepted signal.

3. A system according to claim 1 wherein no personal information is obtained concerning any of the wireless terminals within the DLS when tracking movement of wireless terminals within the DLS.

4. A system according to claim 1 wherein the at least one wireless terminal is selected from a group consisting of a cellular telephone, a pager, a personal data assistant (PDA), and other similar two-way wireless terminal devices.

5. A system according to claim 1 wherein the processor is operative to time stamp and determine intra-DLS physical location of wireless terminals within the DLS during the initial and all subsequent time intervals, respectively.

6. An information gathering method operable with a network architecture, the network architecture including a plurality of synchronized receivers, the method comprising:
mathematically characterizing a defined local space (DLS) as a volumetric array shaped relative to the receivers, the receivers operable to intercept return signals transmitted from two-way wireless terminals within the DLS to a base station of a wireless service provider system, the base station being operable to broadcast a series of request signals, the request signals being intended for one or more of the two-way wireless terminals; and
processing the intercepted return signals to extract terminal specific information therefrom sufficient to physically locate the return signal's associated wireless terminal within the DLS.

7. An information gathering method according to claim 6 wherein the request signals include identifying information that is unique to a particular one of the two-way wireless terminals, thereby causing only the corresponding two-way wireless terminal to transmit the correspondingly intercepted signal.

8. An information gathering method according to claim 6 wherein the wireless terminals are one of a cellular telephone, a two-way pager or a personal data assistant (PDA).

9. A method for monitoring movement of two-way wireless terminals within a defined local space (DLS), comprising:
mathematically characterizing a defined DLS to include a plurality of receivers arranged in a volumetric array;
during a first time interval:
i) determining a first sampling of signals intercepted with the receivers, the first sampling of signals being transmitted by an associated first set of two-way wireless terminals within the DLS, each received signal of the first sampling being associated with a particular two-way wireless terminal within the DLS during the first time interval;
ii) determining initial location information for the first set of two-way wireless terminals within the DLS based on said first sampling of signals;
during a second time interval:
i) determining at least one subsequent sampling of signals intercepted with the receivers, the at least one subsequent sampling of signals being transmitted by an associated subsequent set of two-way wireless terminals within the DLS, each received signal being associated with a particular two-way wireless terminal within the DLS during said subsequent time interval;
ii) determining subsequent location information for the subsequent set of wireless terminals within the DLS based on said subsequent sampling of signals; and
comparing the initial location information to the subsequent location information to ascertain tracking movement of wireless terminals within the DLS.

10. An information gathering method according to claim 9 wherein the intercepted first sampling and subsequent sampling of signals are transmitted from the corresponding two-way wireless terminals in response to receipt of one or more request signals, the request signals being a service request or ping signal transmitted by a base station in an RF signaling channel.

11. An information gathering method according to claim 10 wherein each request signal includes identifying information that is unique to a particular two-way wireless terminal, thereby causing only the corresponding two-way wireless terminal to transmit the correspondingly intercepted signal.

12. An information gathering method according to claim 9 whereby no personal information is obtained concerning any of the wireless terminals within the DLS.

13. An information gathering method according to claim 10 wherein each said wireless terminal is selected from a group consisting of a cellular telephone, a two-way pager, a personal data assistant (PDA), and other similar two-way wireless terminal devices.

14. An information gathering system, comprising:
a mathematically characterized DLS architecture, including:
i) an array of receivers which are synchronized together to identify a volume within the defined local space (DLS);
ii) at least one processor in communication with the array of receivers;
wherein the array of receivers is positioned relative a plurality of two-way wireless terminals such that at least some of the wireless terminals are physically located within the DLS, a base station associated with a wireless service provider system being operable to broadcast an associated request signal to each of the wireless terminals, whereupon each wireless terminal within said DLS is operative to transmit an associated return signal; and
wherein the at least one processor identifies intercepted signals intercepted with the array of receivers, the intercepted signals being generated by one or more of the wireless terminals physically located within the DLS in response to receipt of one of the associated request signals, the at least one processor ascertaining physical location information associated with each wireless terminal within the DLS as function of the intercepted signals.

15. An information gathering system according to claim 14 wherein each request signal is a service request or ping signal transmitted by the base station in an RF signaling channel.

16. An information gathering system according to claim 14 wherein each request signal includes identifying information that is unique to a particular two-way wireless terminal, thereby causing only the corresponding two-way wireless terminal to transmit the correspondingly intercepted signal.

17. An information gathering system according to claim 14 whereby no personal information is obtained from the intercepted signals concerning any of the two-way wireless terminals within the DLS.

18. An information gathering system according to claim 11 wherein the two-way wireless terminals are one a cellular telephone, a two-way pager, a personal data assistant (PDA) or and other similar two-way wireless terminal devices.

19. A system for monitoring movement of two-way wireless terminals with a defined local space (DLS), comprising:
a mathematically characterized DLS architecture, including:
i) an array of receivers which are synchronized together to identify a volume within the defined local space (DLS);

ii) at least one processor in communication with said array of receivers; and a base station associated with a wireless service provider system, said base station adapted to periodically broadcast a series of request signals to a plurality of two-way wireless terminals, each intended for a particular one of said wireless terminals, whereupon said DLS architecture is operative:

i) during a first time interval to:
  (1) intercept a first sampling of return signals transmitted by an associated first set of wireless terminals that are physically within said DLS during the first time interval; and
  (2) log initial location information for the first set of wireless terminals within the DLS based on said first sampling of return signals;

ii) during subsequent time intervals to:
  (1) intercept at least one subsequent sampling of return signals transmitted by an associated set of wireless terminals that are physically located within the DLS during the subsequent time intervals; and
  iii) log subsequent location information for the set of wireless terminals within the DLS based on said sampling of return signals; and
  iii. to compare said initial location information to said subsequent location information to ascertain tracking movement of wireless terminals within the DLS.

20. A system method according to claim 19 wherein each request signal is a service request or ping signal transmitted by a base station in an RF signaling channel, and wherein each request signal includes identifying information that is unique to a particular one of said two-way wireless terminals.

21. A system according to claim 19 wherein no personal information is obtained concerning any of the wireless terminals within the DLS.

22. A system according to claim 19 wherein each said wireless terminal is selected from a group consisting of a cellular telephone, a pager, a personal data assistant (PDA), and other similar two-way wireless terminal devices.

23. A system according to claim 19 wherein said processor is operative to time stamp and determine intra-DLS physical location of all wireless terminals within the DLS during the initial and all subsequent time intervals, respectively.

* * * * *